United States Patent
Deb et al.

(10) Patent No.: US 9,863,344 B2
(45) Date of Patent: Jan. 9, 2018

(54) METHODS AND SYSTEMS TO CONTROL EXHAUST GAS RECIRCULATION

(71) Applicant: General Electric Company, Schenectady, NY (US)

(72) Inventors: Dipankar Deb, Bangalore (IN); Prashant Srinivasan, Bangalore (IN); Medy Satria, Munich (DE); Maruthi Narasinga Rao Devarakonda, Waukesha, WI (US); Dhruval Bhatt, Katy, TX (US)

(73) Assignee: General Electric Company, Schenectady, NY (US)

( * ) Notice: Subject to any disclaimer, the term of this patent is extended or adjusted under 35 U.S.C. 154(b) by 288 days.

(21) Appl. No.: 14/745,868

(22) Filed: Jun. 22, 2015

(65) Prior Publication Data

US 2016/0369723 A1    Dec. 22, 2016

(51) Int. Cl.
*F02D 41/00* (2006.01)
*F02D 41/14* (2006.01)
(Continued)

(52) U.S. Cl.
CPC ......... *F02D 41/0077* (2013.01); *F02D 21/08* (2013.01); *F02D 41/0052* (2013.01);
(Continued)

(58) Field of Classification Search
CPC .. F02D 41/26; F02D 41/0052; F02D 41/0072; F02D 41/0077; F02D 41/1461;
(Continued)

(56) References Cited

U.S. PATENT DOCUMENTS 6,035,640 A    3/2000 Kolmanovsky et al.
6,666,201 B1    12/2003 Mazur
(Continued)

FOREIGN PATENT DOCUMENTS

CN     103016184 A     4/2013
DE  102011005833 A1    9/2012
(Continued)

OTHER PUBLICATIONS

Ming Feng Hsieh et al.,"An extended Kalman filter for NOx sensor ammonia cross-sensitivity elimination in selective catalytic reduction applications", American Control Conference (ACC), 2010, IEEE, Jun. 30, 2010-Jul. 2, 2010, Baltimore, MD., pp. 3033-3038.
(Continued)

*Primary Examiner* — Hieu T Vo
*Assistant Examiner* — Arnold Castro
(74) *Attorney, Agent, or Firm* — John P. Darling (57) ABSTRACT

A system includes an engine comprising an EGR valve that recirculates a portion of exhaust gas, a data repository that stores a first look up and one or more engine operational parameters, an engine control unit operationally coupled to the engine and the data repository, wherein the engine control unit is configured to: determine a desired EGR flow rate reference of the portion of the exhaust gas based on the one or more engine operational parameters and the first look up table, determine a current estimated EGR flow rate based on the one or more engine operational parameters, determine a designated corrected EGR flow rate reference based on the desired EGR flow rate reference and a delta EGR flow rate, determine EGR flow rate error, and determine a percentage opening of the EGR valve based at least on the EGR flow rate error.

20 Claims, 3 Drawing Sheets

(51) Int. Cl.
*F02D 21/08* (2006.01)
*F02D 41/26* (2006.01)

(52) U.S. Cl.
CPC ..... *F02D 41/0072* (2013.01); *F02D 41/1461* (2013.01); *F02D 41/26* (2013.01); *F02D 2021/083* (2013.01); *F02D 2200/0406* (2013.01); *F02D 2250/36* (2013.01); *Y02T 10/47* (2013.01)

(58) Field of Classification Search
CPC ................ F02D 21/08; F02D 2250/36; F02D 2021/083; F02D 2200/0406
See application file for complete search history.

(56) References Cited

U.S. PATENT DOCUMENTS

| | | | |
|---|---|---|---|
| 6,715,476 | B2 | 4/2004 | Gopp et al. |
| 7,165,399 | B2 | 1/2007 | Stewart |
| 8,091,416 | B2 | 1/2012 | Wang et al. |
| 8,621,864 | B2 | 1/2014 | Osburn et al. |
| 8,700,291 | B2 | 4/2014 | Herrmann |
| 2011/0184632 | A1 | 7/2011 | Kang et al. |
| 2012/0265425 | A1 | 10/2012 | Maruyama et al. |
| 2012/0285145 | A1 | 11/2012 | Auckenthaler |
| 2013/0131967 | A1 | 5/2013 | Yu et al. |
| 2014/0261344 | A1* | 9/2014 | Makino ............... F02D 41/1446 123/568.26 |
| 2014/0316641 | A1* | 10/2014 | Wu ......................... F02D 23/02 701/33.9 |
| 2016/0010581 | A1* | 1/2016 | Sixel ....................... F02B 37/16 60/601 |
| 2016/0069285 | A1* | 3/2016 | Watanuki ............ F02D 41/0072 701/108 |
| 2016/0146137 | A1* | 5/2016 | Hagari ................ F02D 41/0072 123/350 |

FOREIGN PATENT DOCUMENTS

| | | |
|---|---|---|
| EP | 1241336 A2 | 9/2002 |
| EP | 2479397 A1 | 7/2012 |
| EP | 2848796 A1 | 3/2015 |
| FR | 2944318 A3 | 10/2010 |
| NO | 2013159899 A1 | 10/2013 |

OTHER PUBLICATIONS

Hussain et al., "Effect of Exhaust Gas Recirculation (EGR) on Performance and Emission characteristics of a Three Cylinder Direct Injection Compression Ignition Engine", Alexandria Engineering Journal, Dec. 2012, vol. 51, Issue 4, pp. 241-247.

Castillo F et al.,"Simultaneous air fraction and low-pressure EGR mass flow rate estimation for diesel engines", IFAC Joint conference SSSC—5th Symposium on System Structure and Control, Grenoble :France (2013), 6 Pages.

PCT Search Report and Written Opinion issued in connection with corresponding PCT Application No. PCT/US16/036350 dated Oct. 17, 2016.

* cited by examiner

METHODS AND SYSTEMS TO CONTROL EXHAUST GAS RECIRCULATION

BACKGROUND

An engine system generally comprises a turbocharger. A turbocharger typically includes a compressor that is rotationally coupled to a turbine via a shaft. Typically when a turbocharger is used with a combustion engine, the turbine of the turbocharger is disposed in the path of exhaust gas exiting the combustion engine. The turbine includes a wheel (hereinafter: 'turbine wheel') that is rotated by the flow of the exhaust gas. The turbine wheel is rotatably coupled to a wheel (hereinafter: 'compressor wheel') of a compressor, in the turbocharger. The compressor is disposed in-line with an air-intake system of the combustion engine. Rotation of the turbine by the exhaust gas flow causes the compressor wheel to likewise rotate, wherein rotation of the compressor wheel acts to increase the flow of fresh air into an air intake system. After directly rotating the turbine, and indirectly rotating the compressor, the exhaust gas exits the turbine.

The exhaust gas exiting the turbine contains nitrous oxides NOx, and hence emission of the exhaust gas into the environments would lead to emission of nitrous oxides NOx into the environment. The emissions of NOx from diesel and gasoline vehicles is regulated and/or restricted via legislation in many countries. A widely adopted route to reduce the NOx emissions is exhaust gas recirculation (EGR). The EGR may involve recirculating a controllable portion of the exhaust gas back into the air intake system. For example, in some internal combustion engines, a portion of exhaust gas generated by one or more combustion cylinders in the internal combustion engines is recirculated within the internal combustion engines via an EGR valve to mix the portion of the exhaust gas and an air-fuel mixture resulting in generation of air-fuel-exhaust mixture. Combustion cylinders in the internal combustion engines combust the air-fuel-exhaust mixture to generate energy and the exhaust gas.

Typically, an amount of exhaust gas to be recirculated into the combustion engine has direct and indirect impact on the performance of the engine and other emissions. Hence, there is a need of methods and systems that effectively control the EGR valve to achieve optimal engine performance along with meeting NOx emission restrictions.

BRIEF DESCRIPTION

In accordance with one embodiment, a system is presented. The system includes an engine comprising an exhaust-gas-recirculation (EGR) valve that recirculates a portion of exhaust gas, generated by the engine, within the engine, a data repository that stores a first look up and one or more engine operational parameters, an engine control unit operationally coupled to the engine and the data repository, wherein the engine control unit is configured to: determine a desired EGR flow rate reference of the portion of the exhaust gas based on the one or more engine operational parameters and the first look up table, determine a current estimated EGR flow rate based on the one or more engine operational parameters, determine a designated corrected EGR flow rate reference based on the desired EGR flow rate reference and a delta EGR flow rate, determine EGR flow rate error based on the current estimated EGR flow rate and the designated corrected EGR flow rate, and determine a percentage opening of the EGR valve based at least on the EGR flow rate error.

In accordance with another embodiment, a system is presented. The system includes an engine comprising an exhaust-gas-recirculation (EGR) valve that recirculates a portion of exhaust gas, generated by the engine, within the engine, an inlet manifold comprising air-fuel-exhaust mixture characterized by a pressure (IMAP), a data repository that stores an IMAP look up table and one or more engine operational parameters, an engine control unit operationally coupled to the engine and the data repository, wherein the engine control unit is configured to determine a desired IMAP reference based on the one or more engine operational parameters and the IMAP look up table, determine a current estimated IMAP in the inlet manifold based on the one or more engine operational parameters, determine a designated corrected IMAP reference based on the desired IMAP reference and a delta IMAP, determine an IMAP error based on the current estimated IMAP and the designated corrected IMAP reference, and determine a percentage opening of the EGR valve based at least on the IMAP error.

In accordance with still another embodiment, a system is presented. The system includes an engine comprising an exhaust-gas-recirculation (EGR) valve that recirculates a portion of exhaust gas, generated by the engine, within the engine, an inlet manifold comprising air-fuel-exhaust mixture characterized by a pressure (IMAP), a data repository that stores a first look up table, an IMAP look up table and one or more engine operational parameters, an engine control unit operationally coupled to the engine and the data repository, wherein the engine control unit is configured to select between an IMAP process and an EGR process based on one or more factors, execute the IMAP process after selection of the IMAP process, wherein the IMAP process comprises determining a desired IMAP reference based on the one or more engine operational parameters and the IMAP look up table, determining a current estimated IMAP in the inlet manifold based on the one or more engine operational parameters, determining a designated corrected IMAP reference based on the desired IMAP reference and a delta IMAP, determining an IMAP error based on the current estimated IMAP and the designated corrected IMAP reference; and determining a percentage opening of the EGR valve based at least on the IMAP error.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "control system" or "controller" may include either a single component or a plurality of components, which are either active and/or passive and are connected or otherwise coupled together to provide the described function or functions.

The present systems and methods, described in detail hereinafter, control and regulate exhaust gas recirculation (EGR) flow rate in an engine. The present systems and methods are capable of controlling exhaust gas recirculation (EGR) flow rate in an engine despite failure of one or more sensors present in the engine. For example, the present systems and methods may control and regulate exhaust gas recirculation (EGR) flow rate in the engine despite failure of a subset of sensors, such as, fuel flow sensor or inlet manifold temperature sensor (IMAT) sensor. The present systems and methods control the exhaust gas recirculation (EGR) flow rate to achieve nitrous oxide (NOx) emissions and formation of particulate matter (PM) within desired limits imposed by a government or a manufacturer. The engine, for example, may include a lean burn engine (for example: gas engine, diesel engine, and dual fuel engine), a stoichiometric engine, an internal combustion engine, or the like that recirculates exhaust gas within the engine.

Figure 1:
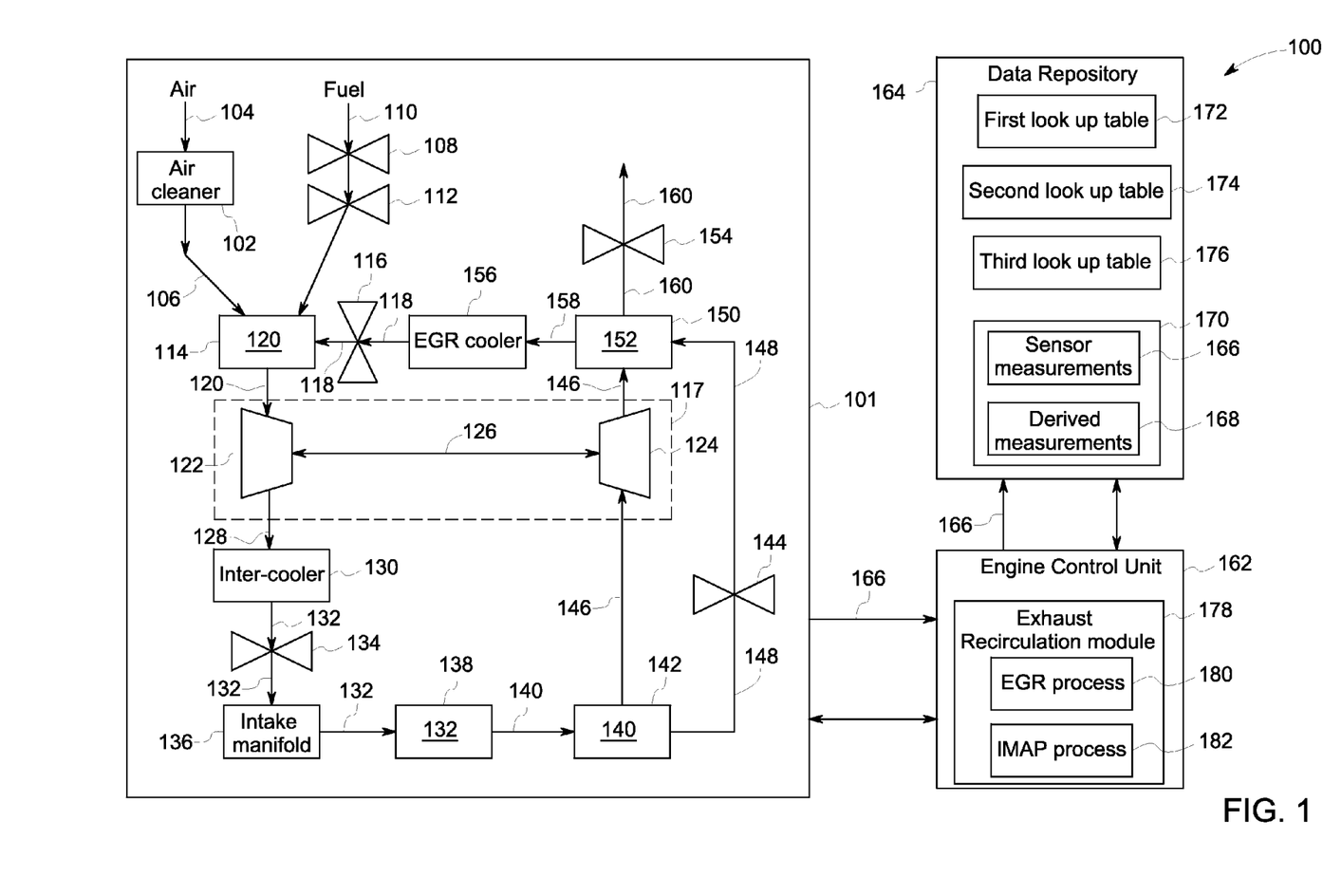
FIG. 1 is an exemplary representation of a block diagram of an exhaust gas recirculation system, in accordance with one embodiment of the present systems.

FIG. 1 is an exemplary representation of a block diagram of an exhaust gas recirculation system 100, in accordance with one embodiment of the present techniques. The system 100 includes an engine 101, an engine control unit 162 and a data repository 164. It is noted that the present systems and techniques should not be restricted to the design and configuration of the engine 101 shown in FIG. 1. In the presently contemplated configuration, the engine 101 includes an air cleaner 102 that receives fresh air 104 from environment and cleans the fresh air 104 to generate cleaned air 106 that complies with determined requirements of the engine 101. For example, the air cleaner 102 is an air filter.

The engine 101 may further include a pressure regulator 108 that receives fuel 110 from a fuel source (not shown), and maintains constant pressure of the fuel 110 while the fuel 110 enters the engine 101. In the presently contemplated configuration, the engine 101 may further include a fuel control valve 112 operationally coupled to the pressure regulator 108, and a pre-compressor volume 114. The fuel control valve 112 controls an amount of the fuel 110 that enters the pre-compressor volume 114 at a time stamp. In the presently contemplated configuration, the pre-compressor volume 114 is further coupled to an EGR valve 116 that may be controlled to transfer a determined amount of cooled exhaust gas 118 into the pre-compressor volume 114. The EGR valve 116, for example may be controlled by the engine control unit 162. Accordingly, the pre-compressor volume 114 receives the cleaned air 106 from the air cleaner 102, the fuel 110 from the fuel control valve 112 and the determined amount of cooled exhaust gas 118 from the EGR valve 116 resulting in formation of an air-fuel-exhaust mixture 120.

The engine 101 additionally includes a turbocharger 117 that includes a compressor 122, a turbine 124 and a shaft 126 that connects the compressor 122 and the turbine 124. A rotation of the turbine 124 rotates the shaft 126 resulting in rotation of the compressor 122. The rotating compressor 122 receives the air-fuel-exhaust mixture 120 from the pre-compressor volume 114 and compresses the air-fuel-exhaust mixture 120 to generate compressed air-fuel-exhaust mixture 128. The engine 101 further includes an inter-cooler 130 operationally coupled to the compressor 122. The inter-cooler 130 receives the compressed air-fuel-exhaust mixture 128 and reduces the temperature of the air-fuel-exhaust mixture 128 to generate cooled air-fuel-exhaust mixture 132.

In one embodiment, the engine 101 further includes a throttle valve 134, an inlet manifold 136 and at least one cylinder 138. The throttle valve 134 couples the inter-cooler 130 to the inlet manifold 136. The throttle valve 134 may be controlled to control an amount of the cooled air-fuel-exhaust mixture 132 that enters the inlet manifold 136. Accordingly, the inlet manifold 136 receives the cooled air-fuel-exhaust mixture 132 from the throttle valve 134. One or more sensors (not shown) may be installed on or inside the inlet manifold 136 to measure temperature and pressure of the cooled air-fuel-exhaust mixture 132 inside the inlet manifold 136. The inlet manifold 136 is coupled to the cylinder 138, and supplies the cooled air-fuel-exhaust mixture 132 to the cylinder 138 for combustion. The combustion of the air-fuel-exhaust mixture 132 results in generation of power (not shown) and exhaust gas 140. While the presently contemplated configuration shows the single cylinder 138, the engine 101 may have more than one cylinder. Again, the presently contemplated configuration does not describe the cylinder 138 as a donor or a non-donor cylinder; however the cylinder 138 may be a donor cylinder or a non-donor cylinder. In one embodiment, when the engine 101 includes two or more cylinders, the cylinders may include donor and/or non-donor cylinders.

The cylinder 138 is coupled to an exhaust manifold 142 that receives the exhaust gas 140 from the cylinder 138. The exhaust manifold 142 is coupled to the turbine 124 of the turbocharger 117 and a waste-gate valve 144. The waste-gate valve 144 may be controlled to control an amount of a first portion 146 of the exhaust gas 140 that rotates the turbine 124, and an amount of a second portion 148 of the exhaust gas 140 that is bypassed into a post turbine volume 150, via the waste-gate valve 144, for potential recirculation within the engine 101. In the presently contemplated configuration, the waste-gate valve 144 is controlled to open to X % such that the first portion 146 of the exhaust gas 140 is directed into the turbine 124, and the second portion 148 of the exhaust gas 140 is directed into the post turbine volume 150 via the waste-gate valve 144. The direction of the first portion 146 of the exhaust gas 140 results in operation/rotation of the turbine 124. As previously noted, the operation of the turbine 124 results in rotation of the shaft 126 resulting in operation/rotation of the compressor 122. Furthermore, the second portion 148 of the exhaust gas 140 is directed into the post turbine volume 150 via the waste-gate valve 144. The post turbine volume 150 receives the first portion 146 of the exhaust gas 146 from the turbine 124 and the second portion 148 of the exhaust gas 140 from the waste-gate 144. Hereinafter, exhaust gas in the post turbine volume 150 shall be referred to by the reference numeral 152. The post turbine volume 150 is operationally coupled to an exhaust-backpressure valve 154 and an exhaust-gas-recirculation (EGR) cooler 156. The exhaust-backpressure valve 154 may be controlled to control a first portion 158 of the exhaust gas 152 that is recirculated into the engine 101, and a second portion 160 of the exhaust gas 152 that is emitted out of the engine 101 after application of an exhaust gas treatment process on the second portion 160. It is noted that while the presently contemplated configuration does not show treatment of the second portion 160 of the exhaust gas 152, however the second portion 160 of the exhaust gas 150 may be treated using appropriate methods before emitting out of the engine 101.

As previously noted, the post turbine volume 150 is coupled to the EGR cooler 156. The EGR cooler 156 receives the first portion 158 of the exhaust gas 150, and cools down the first portion 158 to generate the cooled exhaust gas 118 that is redirected within the engine 101 by directing the cooled exhaust gas 118 into the pre-compressor volume 120. It is noted that the cooled exhaust gas 118 is a portion of the exhaust gas generated by the cylinder 138 of the engine 101. The engine 101 may further include a plurality of sensors (not shown) at multiple locations that generate sensor measurements 166. The sensors may transmit the sensor measurements 166 to the engine control unit 162. As used herein, the term "sensor measurements 166" refers to measurements that are generated by one or more sensors located on or inside one or more components of the engine 101, or on or inside the engine 101. The sensor measurements 166, for example, may include engine speed, engine load, mass flow rate, current NOx emissions, EGR flow rate, fuel flow measurement, exhaust pressure, temperature, oxygen fraction, settings of the valves 108, 112, 116, 134, 144, flow rates, speed, temperature (IMAT) inside the inlet manifold 136, pressure inside the inlet manifold 136, or the like.

As previously noted, the system 100 further includes the engine control unit 162 and the data repository 164. The engine control unit 162 is operationally coupled to the engine 101 and the data repository 164. The engine control unit 162, for example, may be one or more processing subsystems, microprocessors, or the like that communicate on a wired or wireless medium with the engine 101. In one embodiment, the engine control unit 162 comprises a dynamic controller. The dynamic controller, for example, may be a proportional-integral-derivative controller, a proportional controller, a proportional integral controller, a proportional derivative controller, a lag compensator, a lead compensator, a lag-lead compensator, a static decoupler, or the like. It is noted that the engine control unit 162 performs many other functions apart from the functions described with reference to the present systems and methods.

The engine control unit 162 receives the sensor measurements 166 from the engine 101. Particularly, the engine control unit 162 receives the sensor measurements 166 from the one or more sensors (not shown). Furthermore, the engine control unit 166 determines derived measurements 168 based on one or more of the sensor measurements 166 and/or one or more of the derived measurements 168. As used herein, the term "derived measurements 168" refers to measurements that are derived based on one or more of the sensor measurements 166 and/or one or more of the derived measurements 168. The derived measurements 168, for example, may include a volume of an intercooler ($V_{prethrottle}$), a volume of the inlet manifold ($V_{intake}$), a volume of the pre-compressor volume ($V_{precompressor}$), a constant (R), and the like. After determination of the derived measurements 168, the engine control unit 162 may store the derived measurements 168 in the data repository 164. The sensor measurements 166 and the derived measurements 168 shall collectively be referred to as engine operational parameters 170. The engine control unit 162 may store the sensor measurements 166 in the data repository 164.

The data repository 164 stores a first look up table 172, a second look up table 174 and a third look up table 176. The terms "third look up table" and "IMAP look up table" shall be interchangeably used. As used herein, the term "first look up table 172" refers to a table or a function that relates one or more of the engine operational parameters 170 to a desired EGR flow rate reference, however does not take account of current NOx emissions from the engine 101. As used herein, the term "desired EGR flow rate reference" refers to a desired flow rate of a portion (for example: the first portion 158 of the exhaust gas 152 or the cooled exhaust gas 118 in FIG. 1) of exhaust gas generated by the engine 101 that may be recirculated within the engine 101 to achieve desired emission limits (for example desired amount of NOx emissions or desired amount of particulate matter). As used herein, the term "second look up table 174" refers to a table or a function that relates one or more of the engine operational parameters 170 to a desired amount of NOx emissions from the engine 101. The desired amount of NOx emissions generally is less or equal to a fixed value of NOx emissions decided by a government or a manufacturer. As used herein, the term "third look up table 176" refers to a table or a function that relates one or more of the engine operational parameters 170 to a desired pressure (IMAP) reference in the inlet manifold 136, however does not take account of current NOx emissions from the engine 101. As used herein, the term "inlet manifold pressure reference" refers to a desired pressure of the cooled air-fuel-exhaust mixture 132 or the air-fuel-exhaust mixture 128 that should be achieved/maintained inside the inlet manifold 136 to achieve desired emission limits (for example desired amount of NOx emissions or desired amount of particulate matter).

The engine control unit 162 is operationally coupled to the engine 101 and the data repository 158. The engine control unit 162, for example, may be one or more processing subsystems, microprocessors, or the like that communicate on a wired or wireless medium with the engine 101. In one embodiment, the engine control unit 150 comprises a dynamic controller. The dynamic controller, for example, may be a proportional-integral-derivative controller, a proportional controller, a proportional integral controller, a proportional derivative controller, a lag compensator, a lead compensator, a lag-lead compensator, a static decoupler, or the like. The engine control unit 162 controls the engine 101 and various components of the engine 101.

The engine control unit 162 further controls one or more components of the engine 101, such as the EGR valve 116 to control the amount and flow rate of the cooled exhaust gas 118 that enters into the pre-compressor volume 114. The engine control unit 162 may include a plurality of modules to control one or more operations of the engine 101 and the components of the engine 101. In the presently contemplated configuration, the engine control unit 162, for example, includes an exhaust recirculation module 178 that determines and controls a percentage opening of the EGR valve 116 to control the amount of cooled exhaust gas 118 and/or the first portion exhaust gas 158 that is recirculated within the engine 101. The exhaust recirculation module 178 may choose between an EGR process 180 and an IMAP process 182 for determining the percentage opening of the exhaust-gas-recirculation valve 116. The exhaust recirculation module 170 may choose between the EGR process 180 and the IMAP process 182 based on one or more factors comprising user preference, error resilience, and operational condition of sensors installed on or inside the engine 101 or components of the engine 101. For example, when one or more of the sensors, such as fuel flow sensor or IMAT sensor is unavailable or non-operational, then the IMAP process may be used for determining the percentage opening of the EGR valve 116.

The exhaust recirculation module 178 may determine the percentage opening of the EGR valve 116 by executing the EGR process 180 based on at least one or more of the first look up table 172, the second look up table 174 and one or more of the engine operational parameters 170. An example of the EGR process 180 is explained with reference to FIG. 2. In alternative embodiment, the exhaust recirculation module 178 may determine the percentage opening of the EGR valve 116 by executing the IMAP process 182 based on at least one or more of the second look up table 174, the third look up table 176 and one or more of the engine operational parameters 170. An example of the IMAP process is explained in greater detail with reference to FIG. 3. The EGR process 180 and/or the IMAP process 182, for example, may be a software and/or hardware wherein at least a portion of the EGR process 180 and/or the IMAP process 182 is designed on a chipset.

The exhaust recirculation module 178 controls the amount of the cooled exhaust gas 118 or the first portion 158 of the exhaust gas 152 that enters the pre-compressor volume 114 by controlling the percentage opening of the EGR valve 116. Accordingly, the exhaust recirculation module 178 indirectly controls the amount of the cooled exhaust gas 118 or the first portion 158 of the exhaust gas 152 that is recirculated within the engine 101 by controlling the percentage opening of the EGR valve 116. By controlling the amount of the cooled exhaust gas 118 that is recirculated within the engine 101, the exhaust recirculation module 178 maintains nitrous oxide (NOx) emissions and formation of particulate matter (PM) within desired limits imposed by a government or a manufacturer.

Figure 2:
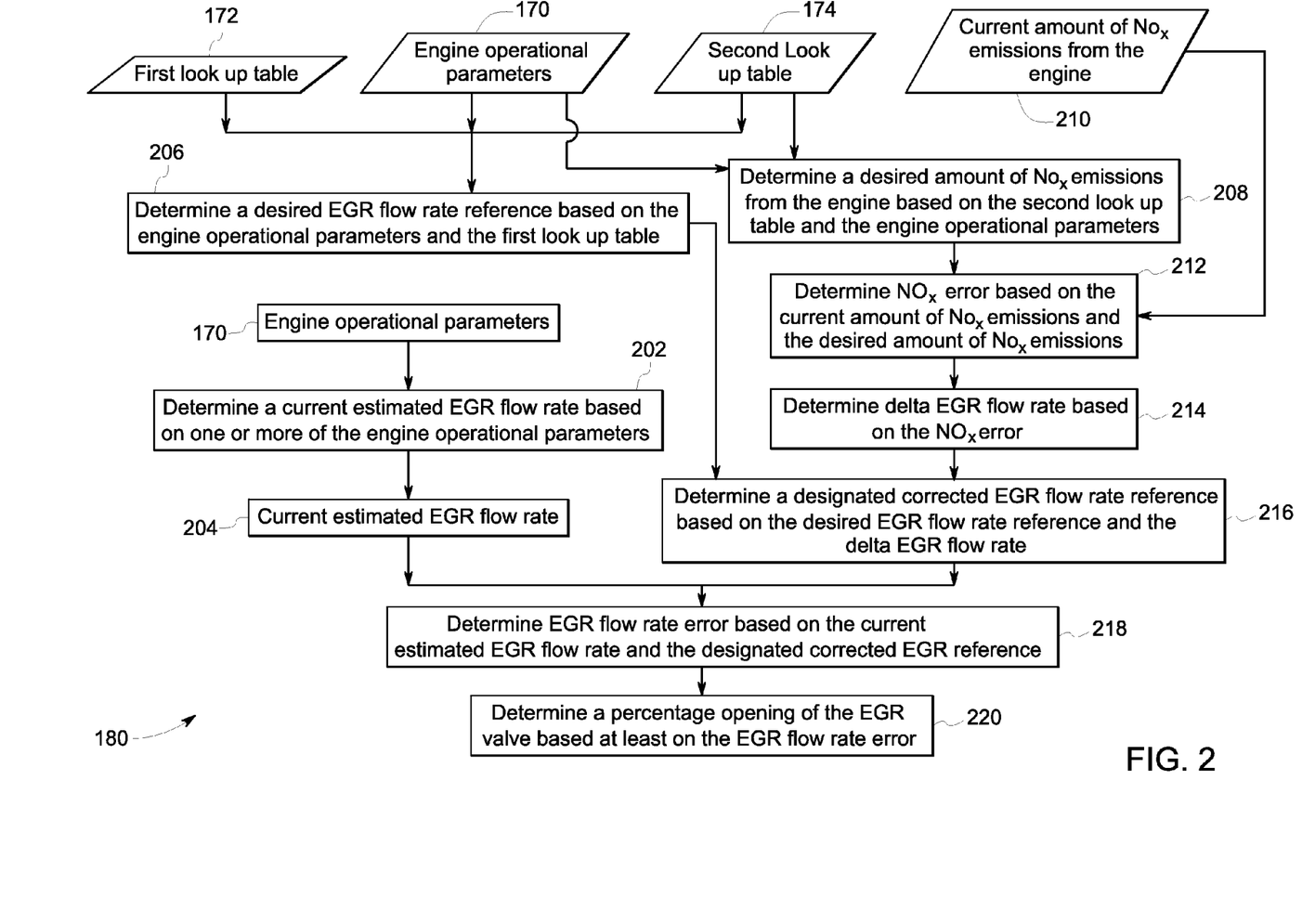
FIG. 2 is a is a flow chart of an EGR process, in accordance with one embodiment of the present techniques.

FIG. 2 is a is a flow chart of the EGR process 180 referred to in FIG. 1, in accordance with one embodiment of the present techniques. The EGR process 180, for example may be executed by the engine control unit 162 or the exhaust recirculation module 178 referred to in FIG. 1. Reference numeral 170 is representative of the engine operational parameters referred to in FIG. 1.

At block 202, a current estimated EGR flow rate 204 of a portion of exhaust gas (for example: generated by the engine 101) that is recirculated within the engine 101 may be determined based on one or more of the engine operational parameters 170. For example, a current estimated flow rate of the cooled exhaust gas 118 or the portion 158 of the exhaust gas 152 referred to in FIG. 1 may be determined. For example, the current estimated EGR flow rate may be determined using the following equation (1):

$$\hat{Q}_{egr} = \frac{(V_{intake} + V_{prethrottle} + V_{precompressor}) \times P_{in}}{R \times IMAT} - Q_{air} - Q_{gas} - Q_{tot} \qquad (1)$$

wherein $\hat{Q}_{egr}$ is a current estimated EGR flow rate of the first portion 158 of the exhaust gas 152 or the cooled exhaust gas 118 (see FIG. 1), $V_{intake}$ is volume of the inlet manifold 136, $V_{prethrottle}$ is volume of the intercooler 130 and volume of one or more pipes that connect the pre-compressor volume 114 to the throttle valve 134 (see FIG. 1), $V_{precompressor}$ is volume of the pre-compressor volume 114, $Q_{air}$ is mass flow rate of the fresh air 104 at a time stamp t, $Q_{gas}$ is mass flow rate of the fuel 110 at the time stamp t, $Q_{tot}$ is mass flow rate of the cooled air-fuel-exhaust mixture 132 at a time stamp t, $P_{in}$ is current pressure (IMAP) of the cooled air-fuel-exhaust mixture 132 inside the inlet manifold 136, IMAT is temperature of the inlet manifold 136, R is a value determined based on mass flow rate of the fresh air 102 ($Q_{air}$), and $Q_{gas}$ is mass flow rate of the fuel 110 at a current time stamp t. The mass flow rate of the fuel 110 ($Q_{gasr}$), for example, may be determined using the following equation (2):

$$Q_{air} = AFR_{stoich} \times \lambda \times Q_{gas}(t-1) \qquad (2)$$

wherein $AFR_{stoich}$ is stoichiometric air to fuel ratio in the air-fuel-exhaust gas mixture 120 (see FIG. 1) or the cooled air-fuel-exhaust gas mixture 132 or the compressed air-fuel-exhaust mixture 128, λ is a measured air-fuel equivalence ratio, $Q_{gas}(t-1)$ is mass flow rate of the fuel 110 at a previous time stamp t−1. The $Q_{tot}$ may be determined using the following equation (3):

$$Q_{Tot} = \frac{\eta_V \times P_{in} \times N_{rpm} \times V_d}{R \times IMAT} \qquad (3)$$

where $N_{rpm}$ is speed of the engine 101, IMAT is temperature of the cooled air-fuel-exhaust mixture 132 in the inlet manifold 136, $P_{in}$ is current measured pressure (IMAP) in the inlet manifold 136 that may be measured by a sensor installed around the inlet manifold 136, $n_v$ is volumetric efficiency of the engine 101, $V_d$ is displaced volume of one or more cylinders (for example: cylinder 138 in FIG. 1) present in the engine 101.

$$R = \frac{a \times Q_{gas}(t-1) + b \times Q_{air} + c \times Q_{egr}(t-1)}{Q_{Tot}(t-1)} \qquad (4)$$

wherein a, b and c are constants. As previously noted with reference to FIG. 1, reference numeral 172 is representative of the first look up table and reference numeral 170 is representative of the engine operational parameters 170. At block 206, a desired EGR flow rate reference may be determined based on the engine operational parameters 170 and the first look up table 172. As previously noted with reference to FIG. 1, the term "desired EGR flow rate reference" refers to a desired flow rate of a portion of exhaust gas generated by the engine 101 (for example: the first portion 158 of the exhaust gas 152 or the cooled exhaust gas 118 in FIG. 1) that may be recirculated within the engine 101 to achieve desired emission limits (for example desired amount of NOx emissions or desired amount of particulate matter). The desired EGR flow rate reference, for example, may be determined by mapping one or more of the engine operational parameters 170 to the desired EGR flow rate reference using the first look up table 172. Since current NOx emissions is not one of the engine operational parameter 170, the desired EGR flow rate reference may not be determined taking into account the current $NO_x$ emissions, and hence achievement of the desired EGR flow rate reference may not result in desired amount of NOx emissions. In other words, achieving the desired EGR flow rate reference may not result in achieving NOx emissions within desired limits. Hence, the desired EGR flow rate reference is tweaked by executing the blocks 208-220.

At block 208, a desired amount of NOx emissions from the engine 101, may be determined based on the second look up table 174 and the engine operational parameters 170. The desired amount of NOx emissions, for example, may be determined by mapping the engine operational parameters 170 to the desired amount of NOx emissions using the second look up table 174. Reference numeral 210 is representative of current amount of NOx emissions from the engine 101. The current amount of NOx emissions 210, for example may be received from one or more sensors located in the engine 101. At block 212, NOx error may be determined based on the desired amount of NOx emissions and the current amount of NOx emissions. For example, the NOx error may be determined by subtracting the current amount of NOx emissions from the desired amount of NOx emissions.

Furthermore, at block 214, delta EGR flow rate may be determined based on the NOx error. As used herein, the term "delta EGR flow rate" refers to a flow rate quantity that is added or subtracted from the desired EGR flow rate reference to correct the desired EGR flow rate reference to take into account the current amount of NOx emissions and the desired amount of NOx emissions. At block 216, a designated corrected EGR flow rate reference is determined based on the desired EGR flow rate reference and the delta EGR flow rate. As used herein, the term "designated corrected EGR flow rate reference" refers to a desired flow rate of exhaust gas (for example: the first portion 158 of the exhaust gas 152 or the cooled exhaust gas 118 in FIG. 1) determined by taking into account the current amount of NOx emissions, the desired amount of NOx emissions and the engine operational parameters 170, wherein achievement of the corrected EGR flow rate may result in achievement of the desired amount of NOx emissions. The designated corrected EGR flow rate reference may be determined by adding or subtracting the delta EGR flow rate to the desired EGR flow rate reference.

At block 218, EGR flow rate error may be determined based on the current estimated EGR flow rate 204 (determined at the block 202) and the designated corrected EGR flow rate reference (determined at the block 216). The EGR flow rate error may be determined by subtracting the current estimated EGR flow rate 204 from the designated corrected EGR flow rate reference. At block 220, a percentage opening of the EGR valve 116 may be determined at least based on the EGR flow rate error. For example, the percentage opening of the EGR valve 116 may be determined by a proportional-integral-derivative controller (not shown) in the exhaust recirculation module 178 or the engine control unit 162 or. The percentage opening of the EGR valve 116 may be determined at least by solving a transfer function at least based on the EGR flow rate error.

Figure 3:
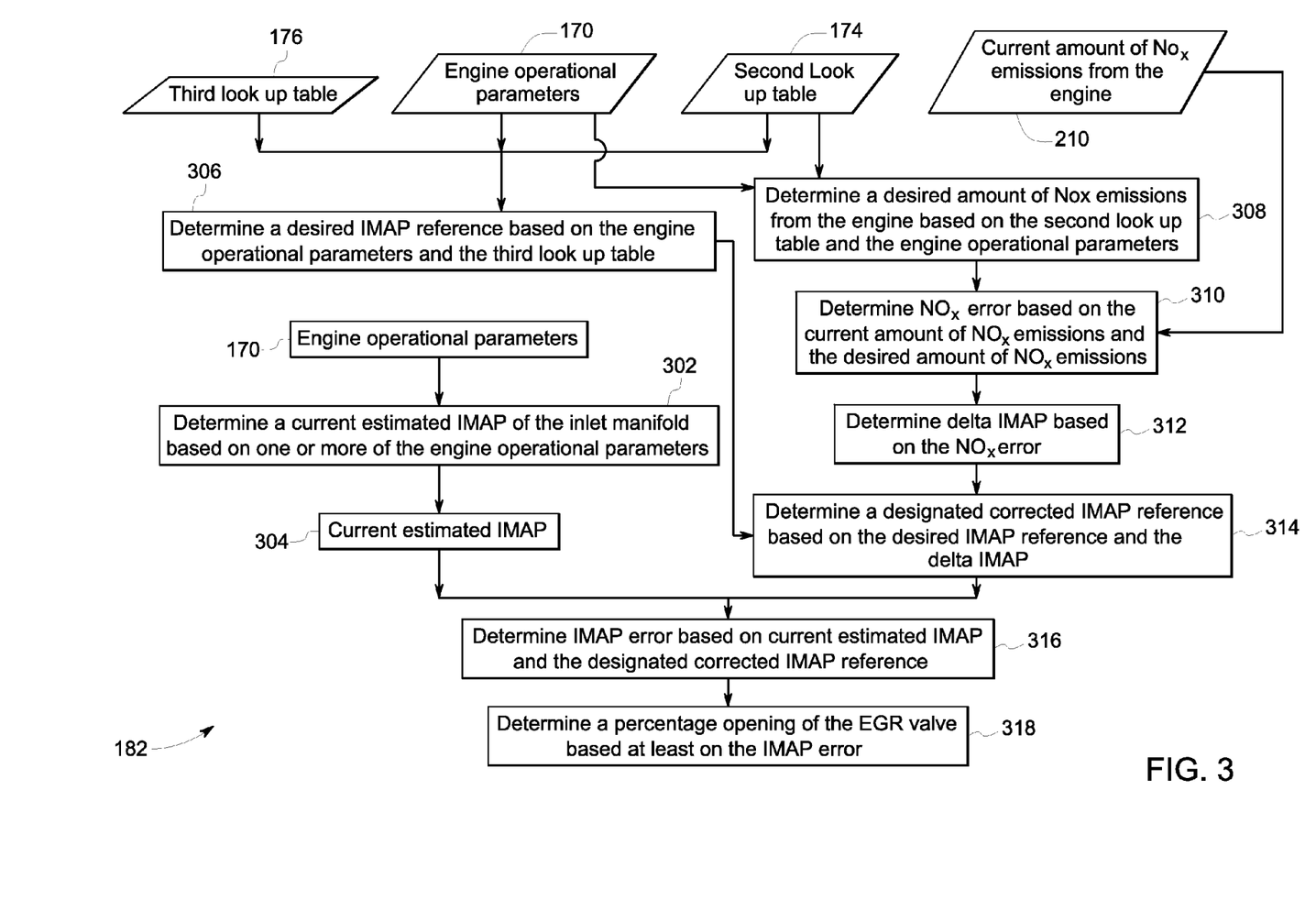
FIG. 3 is a flow chart of an IMAP process, in accordance with one embodiment of the present techniques.

FIG. 3 is a flow chart of the IMAP process 182 referred to in FIG. 1, in accordance with one embodiment of the present techniques. The IMAP process 182, for example may be executed by the engine control unit 162 or the exhaust recirculation module 178 referred to in FIG. 1. Reference numeral 170 is representative of the engine operational parameters referred to in FIG. 1.

At block 302, a current estimated pressure (IMAP) 304 of an air-fuel-exhaust mixture (for example: the cooled air-fuel-exhaust mixture 132) in the inlet manifold 136 may be determined based on one or more of the engine operational parameters 170. For example, the current IMAP may be determined using the following equation (5):

$$\hat{p}_{in}^{\bullet} = \frac{R \times IMAT}{V_{intake} + V_{prethrottle} + V_{precompressor}}(Q_{air} + Q_{gas} + Q_{egr} - Q_{Tot}) + u_1 \quad (5)$$

wherein $\hat{p}_{in}$ is current estimated pressure (IMAP) of the cooled air-fuel-exhaust mixture 132 in the inlet manifold 136, IMAT is temperature of the cooled air-fuel-exhaust mixture 132 in the inlet manifold 136, $Q_{air}$ is mass flow rate of the fresh air 104 at a time stamp t, $Q_{gas}$ is mass flow rate of the fuel 110 at the time stamp t, $Q_{tot}$ is mass flow rate of the cooled air-fuel-exhaust mixture 132 entering into the cylinder 138 at a time stamp t, R is the value (see equation (4)) determined based on the mass flow rate of the fresh air 104 and $u_1$ is a variable.

As previously noted with reference to FIG. 1, reference numeral 176 is representative of the third look up table and reference numeral 170 is representative of the engine operational parameters 170. At block 306, a desired IMAP reference may be determined based on one or more of the engine operational parameters 170 and the third look up table 176. As used herein, the term "desired IMAP reference" refers to a desired pressure of an air-fuel-exhaust mixture in the inlet manifold 136 that does not take into account current NOx emissions from the engine 101 and desired NOx emissions from the engine 101. The desired IMAP reference, for example, may be determined by mapping one or more of the engine operational parameters 170 to the desired IMAP reference using the third look up table 176. Since current NOx emissions is not one of the engine operational parameter 170, the desired IMAP reference may not be determined taking into account the current $NO_x$ emissions, and hence achievement of the desired IMAP reference may not result in desired amount of NOx emissions. In other words, achieving the desired IMAP reference may not result in achieving NOx emissions within desired limits. Hence, the desired IMAP reference is tweaked by executing the blocks 308-320.

At block 308, a desired amount of NOx emissions from, the engine 101, may be determined based on the second look up table 174 and the engine operational parameters 170. The desired amount of NOx emissions, for example, may be determined by mapping the engine operational parameters 170 to the desired amount of NOx emissions using the second look up table 174. Reference numeral 210 (see FIG. 2) is representative of current amount of NOx emissions from the engine 101. At block 310, NOx error may be determined based on the desired amount of NOx emissions and the current amount of NOx emissions. For example, the NOx error may be determined by subtracting the current amount of NOx emissions from the desired amount of NOx emissions.

Furthermore, at block 312, delta IMAP may be determined based on the NOx error. As used herein, the term "delta IMAP" refers to a pressure (IMAP) in the inlet manifold 136 that may be added or subtracted from the desired IMAP reference to correct the desired IMAP reference by taking into account the current amount of NOx emissions and the desired amount of NOx emissions. At block 314, a designated corrected IMAP reference is determined based on the desired IMAP reference and the delta IMAP. As used herein, the term "designated corrected IMAP reference" refers to a desired pressure (IMAP) of the cooled air-fuel-exhaust mixture 132 in the inlet manifold 136 determined by taking into account the current amount of NOx emissions, the desired amount of NOx emissions and the engine operational parameters 170, wherein achievement of the designated corrected IMAP reference may result in achievement of the desired amount of NOx emissions. The designated corrected IMAP reference may be determined by adding or subtracting the delta IMAP to the designated corrected IMAP reference.

At block 316, IMAP error may be determined based on the current estimated IMAP 304 (determined at the block 302) and the designated corrected IMAP reference (determined at the block 314). The IMAP error may be determined by subtracting the current estimated IMAP from the designated corrected IMAP reference. At block 318, a percentage opening of the EGR valve 116 may be determined at least based on the IMAP error. For example, the percentage opening of the EGR valve 116 may be determined by a proportional-integral-derivative controller (not shown) in the exhaust gas recirculation module 178 or the engine control unit 162. The percentage opening of the EGR valve 116 may be determined at least by solving a transfer function at least based on the IMAP error.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
   an engine comprising an exhaust-gas-recirculation (EGR) valve that recirculates a portion of a exhaust gas, generated by the engine, within the engine;
   a data repository that stores a first look up table and one or more engine operational parameters;
   an engine control unit operationally coupled to the engine and the data repository, wherein the engine control unit is configured to:
      determine a desired EGR flow rate reference of the portion of the exhaust gas based on the one or more engine operational parameters and the first look up table;
      determine a current estimated EGR flow rate based on the one or more engine operational parameters;
      determine a delta EGR flow rate based on a current amount of NOx emissions and a desired amount of NOx emissions;
      determine a designated corrected EGR flow rate reference based on the desired EGR flow rate reference and the delta EGR flow rate, wherein the delta EGR flow rate is used to correct the desired EGR flow rate reference to account for the current amount of NOx emissions and the desired amount of NOx emissions;
      determine EGR flow rate error based on the current estimated EGR flow rate and the designated corrected EGR flow rate reference;
      determine a percentage opening of the EGR valve based at least on the EGR flow rate error; and
      control the EGR valve to achieve the percentage opening of the EGR valve.

2. The system of claim 1, wherein the first look up table comprises a table or a function that relates the one or more engine operational parameters to the desired EGR flow rate reference, however does not take into account the current NOx emissions from the engine.

3. The system of claim 1, wherein the engine control unit is configured to determine the desired EGR flow rate reference by mapping the one or more engine operational parameters to the desired EGR flow rate reference using the first look up table.

4. The system of claim 1, wherein the engine control unit is configured to determine the designated corrected EGR flow rate reference by subtracting the delta EGR flow rate from the desired EGR flow rate reference.

5. The system of claim 1, wherein the data repository further stores a second look up table and an IMAP-look-up-table.

6. The system of claim 5, wherein the engine control unit is further configured to:
   receive the current amount of NOx emissions;
   determine the desired amount of NOx emissions from the engine based on the second look up table and the one or more engine operational parameters;
   determine a NOx error based on the current amount of NOx emissions and the desired amount of NOx emissions; and
   determine the delta EGR flow rate based on the NOx error.

7. The system of claim 6, wherein the second look up table comprises a function that relates the one or more engine operational parameters to the desired amount of NOx emissions from the engine.

8. The system of claim 6, wherein the engine control unit is configured to determine the desired amount of NOx emissions by mapping the one or more engine operational parameters to the desired amount of NOx emissions using the second look up table.

9. The system of claim 1, wherein the engine control unit is configured to control the EGR valve to achieve the percentage opening of the EGR valve resulting in the desired amount of NOx emissions and a desired amount of formation of particulate matter.

10. A system, comprising:
    an engine comprising:
       an exhaust-gas-recirculation (EGR) valve that recirculates a portion of exhaust gas, generated by the engine, within the engine;
       an inlet manifold comprising air-fuel-exhaust mixture characterized by a pressure (IMAP);
    a data repository that stores an IMAP-look-up-table and one or more engine operational parameters;
    an engine control unit operationally coupled to the engine and the data repository, wherein the engine control unit is configured to:
       determine a desired IMAP reference based on the one or more engine operational parameters and the IMAP look up table;
       determine a current estimated IMAP in the inlet manifold based on the one or more engine operational parameters;
       determine a delta IMAP based on a current amount of NOx emissions and a desired amount of NOx emissions;
       determine a designated corrected IMAP reference based on the desired IMAP reference and the delta IMAP, wherein the delta IMAP is used to correct the desired IMAP reference to account for the current amount of NOx emissions and the desired amount of NOx emissions;
       determine an IMAP error based on the current estimated IMAP and the designated corrected IMAP reference;
       determine a percentage opening of the EGR valve based at least on the IMAP error; and
       control the EGR valve to achieve the percentage opening of the EGR valve.

11. The system of claim 10, wherein the IMAP-look-up-table comprises a table or a function that relates the one or more engine operational parameters to the desired IMAP reference.

12. The system of claim 10, wherein the engine control unit is configured to determine the desired IMAP reference by mapping the one or more engine operational parameters to the desired IMAP reference using the IMAP-look-up-table.

13. The system of claim 10, wherein the engine control unit is configured to determine the designated corrected IMAP reference by subtracting the delta IMAP from the desired IMAP reference.

14. The system of claim 10, wherein the data repository further stores a second look up table comprising a function or a table that relates the one or more engine operational parameters to a desired amount of NOx emissions from the engine.

15. The system of claim 14, wherein the engine control unit is further configured to:
receive the current amount of NOx emissions;
determine the desired amount of NOx emissions from the engine based on the second look up table and the one or more engine operational parameters;
determine a NOx error based on the current amount of NOx emissions and the desired amount of NOx emissions; and
determine the delta IMAP based on the NOx error.

16. The system of claim 15, wherein the engine control unit is configured to determine the desired amount of NOx emissions by mapping the one or more engine operational parameters to the desired amount of NOx emissions using the second look up table.

17. The system of claim 1, wherein the engine control unit is further configured to control the EGR valve to achieve the percentage opening of the EGR valve resulting in the desired amount of NOx emissions and a desired amount of formation of particulate matter.

18. A system, comprising:
an engine comprising:
an exhaust-gas-recirculation (EGR) valve that recirculates a portion of exhaust gas, generated by the engine, within the engine;
an inlet manifold comprising air-fuel-exhaust mixture characterized by a pressure (IMAP);
a data repository that stores a first look up table, an IMAP-look-up-table and one or more engine operational parameters;
an engine control unit operationally coupled to the engine and the data repository, wherein the engine control unit is configured to:
select between an IMAP process and an EGR process based on one or more factors;
determine a percentage opening of the EGR valve by executing the IMAP process or the EGR process after selection of the IMAP process or the EGR process,
control the EGR valve to achieve the percentage opening of the EGR valve, wherein the IMAP process comprises:
determining a desired IMAP reference based on the one or more engine operational parameters and the IMAP-look-up-table;
determining a current estimated IMAP in the inlet manifold based on the one or more engine operational parameters;
determining a delta IMAP based on a current amount of NOx emissions and a desired amount of NOx emissions;
determining a designated corrected IMAP reference based on the desired IMAP reference and the delta IMAP, wherein the delta IMAP is used to correct the desired IMAP reference to account for the current amount of NOx emissions and the desired amount of NOx emissions; and
determining an IMAP error based on the current estimated IMAP and the designated corrected IMAP reference,
wherein the EGR process comprises determining a designated corrected EGR flow rate reference based on a delta EGR flow rate, wherein the delta EGR flow rate is used to correct a desired EGR flow rate reference to account for the current amount of NOx emissions and the desired amount of NOx emissions.

19. The system of claim 18, wherein the one or more factors comprise a user preference, error resilience, operational condition of one or more sensors installed on or inside the engine or components of the engine, or combinations thereof.

20. The system of claim 18, wherein the engine control unit is configured to execute the EGR process after selection of the EGR process, wherein the EGR process further comprises:
determining the desired EGR flow rate reference of the portion of the exhaust gas based on the one or more engine operational parameters and the first look up table;
determining a current estimated EGR flow rate based on the one or more engine operational parameters;
determining the designated corrected EGR flow rate reference based on the desired EGR flow rate reference and delta EGR flow rate;
determining EGR flow rate error based on the current estimated EGR flow rate and the designated corrected EGR flow rate; and
determining a percentage opening of the EGR valve based at least on the EGR flow rate error.

* * * * *